United States Patent
Morales

(10) Patent No.: US 12,392,441 B1
(45) Date of Patent: *Aug. 19, 2025

(54) POOL AERATOR VALVE PROTECTIVE SEALING COVER

(71) Applicant: Hugo E. Morales, Lanoka Harbor, NJ (US)

(72) Inventor: Hugo E. Morales, Lanoka Harbor, NJ (US)

( * ) Notice: Subject to any disclaimer, the term of this patent is extended or adjusted under 35 U.S.C. 154(b) by 454 days.

This patent is subject to a terminal disclaimer.

(21) Appl. No.: 17/946,199

(22) Filed: Sep. 16, 2022

Related U.S. Application Data

(60) Provisional application No. 63/245,008, filed on Sep. 16, 2021.

(51) Int. Cl.
*F16L 55/115* (2006.01)
*E04H 4/14* (2006.01)

(52) U.S. Cl.
CPC .............. *F16L 55/115* (2013.01); *E04H 4/14* (2013.01)

(58) Field of Classification Search
CPC ................................ F16L 55/115; E04H 4/14
USPC ........................................................... 138/89
See application file for complete search history.

(56) References Cited

U.S. PATENT DOCUMENTS

| | | |
|---|---|---|
| 3,578,023 A | 5/1971 | Diemond |
| 4,264,039 A | 4/1981 | Moreland |
| 4,561,134 A | 12/1985 | Mathews et al. |
| 4,805,664 A | 2/1989 | Mattei et al. |
| 4,951,326 A | 8/1990 | Barnes et al. |
| 5,225,075 A | 7/1993 | Cunningham |
| 7,419,194 B2 | 9/2008 | Feith |
| 7,743,437 B2 | 6/2010 | Reynoso |
| D857,179 S | 8/2019 | Thompson |
| 11,866,954 B1 * | 1/2024 | Morales .................. E04H 4/144 |
| 2006/0066098 A1 | 3/2006 | Yeager et al. |
| 2014/0053330 A1 | 2/2014 | Butera et al. |

* cited by examiner

*Primary Examiner* — David R Deal
(74) *Attorney, Agent, or Firm* — Goldstein Law Offices, P.C.

(57) ABSTRACT

A protective sealing cover for a swimming pool aerator valve comprising a cap and a plug formed from a compressible elastic material, the aerator valve is embedded within a planar surface and has a bore portion, an aperture providing access to the bore portion, and a flange surrounding the aperture, the plug is adapted to form a watertight seal with the aperture to prevent water and debris from entering the bore portion, the cap has an inner surface and cap recess adapted to fully enclose the flange such that the inner surface rests against the planar surface, the cap further having a flat outer face which forms a non-abrasive surface.

8 Claims, 9 Drawing Sheets

POOL AERATOR VALVE PROTECTIVE SEALING COVER

CROSS-REFERENCE TO RELATED APPLICATIONS

This application is a nonprovisional utility application of provisional patent application, Ser. No. 63/245,008 filed in the United States Patent Office on Sep. 16, 2021, claims priority therefrom, and is expressly incorporated herein by reference in its entirety.

TECHNICAL FIELD

The present disclosure relates generally to a swimming pool winterization device. More particularly, the present disclosure relates to a protective sealing cover for sealing and protecting an aerator valve for a swimming pool aeration system.

BACKGROUND

Swimming pools must be properly maintained to both prevent contamination to the pool water, or damage to the equipment and machines ensure the safe and sanitary operation of the swimming pool itself. One highly important aspect of pool maintenance is known as winterization, a process by which a pool is prepared for a long period of inactivity. Winterization involves sealing up exposed valves, nozzles, or intakes located on the pool deck or on the walls of the pool to prevent unwanted infiltration of water in the form of rain and snow, and debris such as leaves, garbage, or other foreign objects. A pool cover is also stretched over the pool itself to prevent dust and debris from falling into the pool water. Lack of effective sealing results in an unsanitary accumulation of moisture and debris, which may further cause damage to pool systems due to corrosion or expansion of ice.

Conventional caps and plugs used for winterization have a threaded plug projecting from a rigid cap. The plug is screwed into a valve, while a rubber ring seal positioned on the cap is used to prevent the infiltration of unwanted water into the valve. Grips, tabs, or other protrusions project from the cap to aid in the installation and removal of conventional caps. However, conventional caps and plugs have several serious flaws.

Deterioration of the rubber ring or improper tightening would compromise the watertight seal between the plug and the valve. Furthermore, sheet-like pool covers are often placed in direct contact with conventional caps and plugs. For example, a pool cover which covers part of a pool deck may contact a cap which is used to seal an aerator valve embedded in the pool deck surface. Friction between the pool cover and any grip-aiding protrusions will cause the cap to continuously abrade and potentially tear the pool cover, thereby compromising the protection of the pool cover.

Therefore, a need exists for an improved protective cover which forms a consistent watertight seal with the pool valve, and has a non-abrasive cap which prevents the pool cover from being compromised from friction between the cap and the pool cover.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a protective cover which creates a watertight seal over an aerator valve of a swimming pool aeration system, or other pool valve. The aerator valve has an aperture leading to a bore portion. Accordingly, the present disclosure provides a protecting sealing cover comprising a cap and a plug. The plug is formed of a compressible elastic material such as PVC, and is adapted to be inserted through the aperture to create a watertight seal which prevents the entry of water and debris into the bore portion.

It is another aspect of an example embodiment in the present disclosure to provide a protective cover which fully encloses the aerator valve. The aperture of the aerator valve is surrounded by a flange. The aerator valve is embedded in a planar surface with the aperture opening away from the planar surface, and with the flange projecting partially above the planar surface. Accordingly, the present disclosure provides a protective sealing cover which has a cap recess which is wider than the flange, allowing the cap to rest flush against the planar surface while fully enclosing the flange It is yet another aspect of an example embodiment in the present disclosure to provide a protective cover which minimizes abrasion and tearing of pool covers. Accordingly, the cap of the protective sealing cover has a substantially flat outer surface facing away from the planar surface, limiting abrasion between the outer surface and pool covers placed thereon and preventing the tearing thereof.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
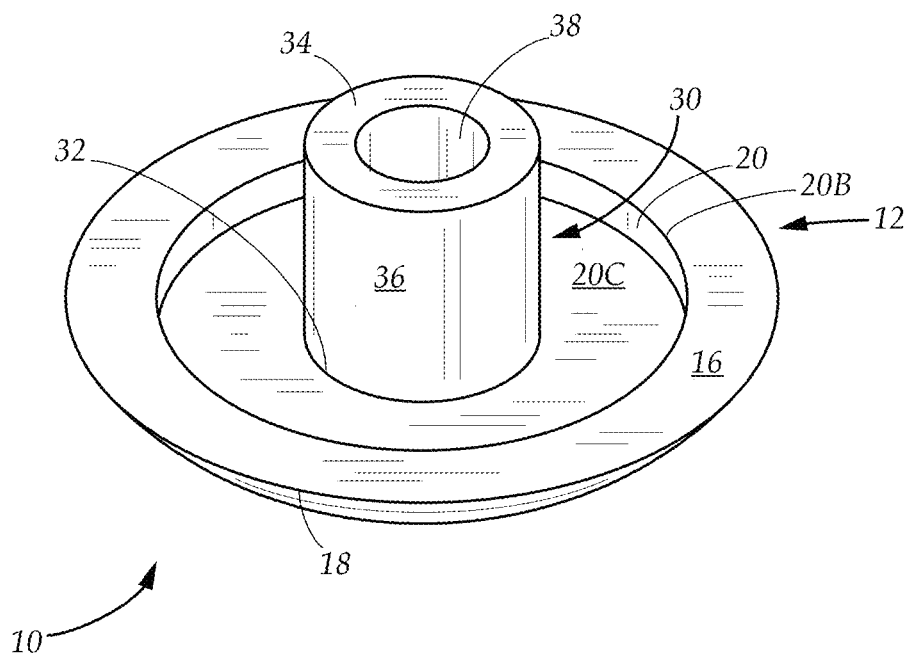
FIG. 1 is diagrammatical perspective view of a protective sealing cover with a cap and a plug, the cap having an inner surface from which the plug projects, and a cap recess, in accordance with an embodiment in the present disclosure.
Figure 3:
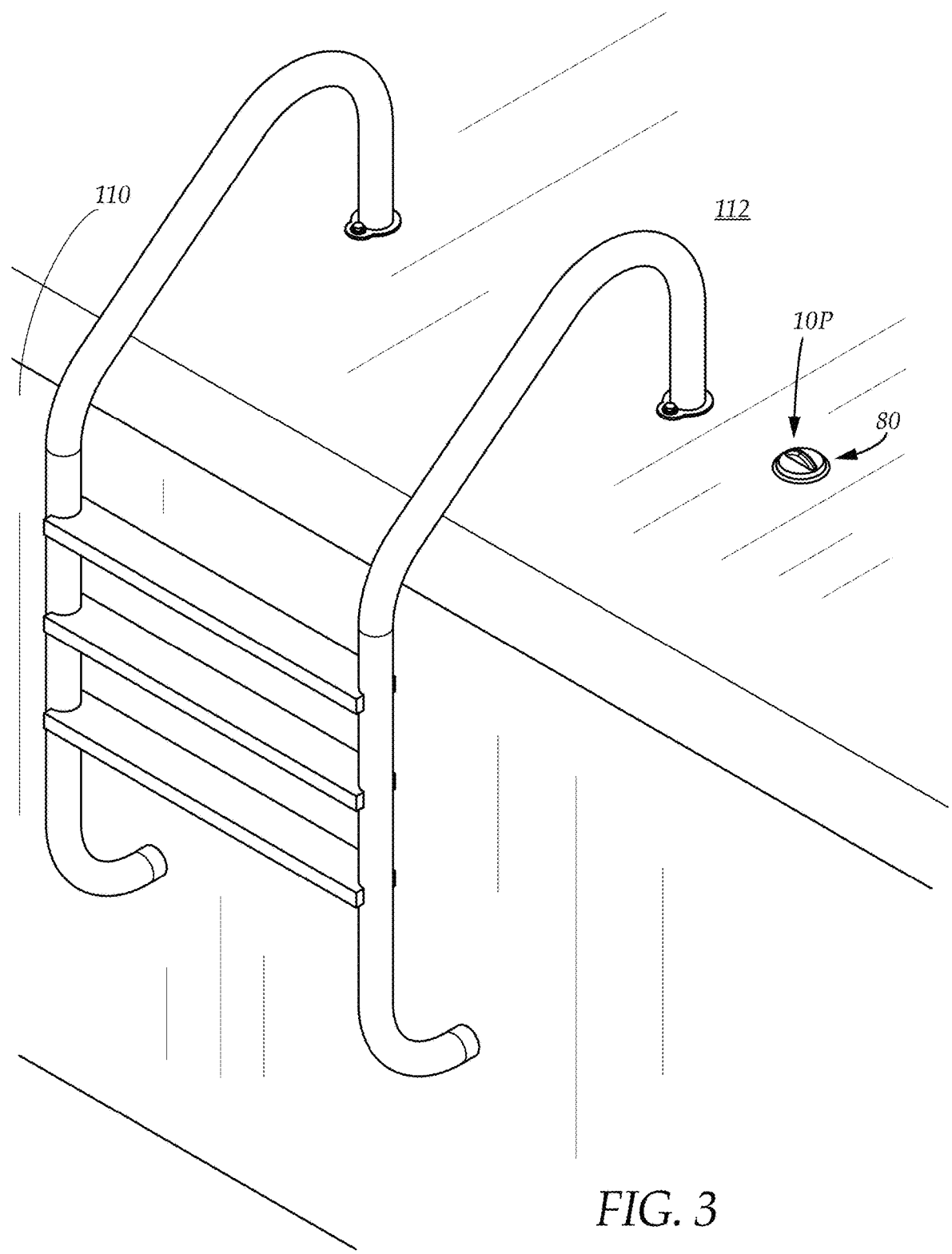
FIG. 3 is diagrammatical perspective view of a swimming pool surrounded by a planar surface, further showing an aerator valve positioned on the planar surface, in accordance with an embodiment in the present disclosure.
Figure 4:
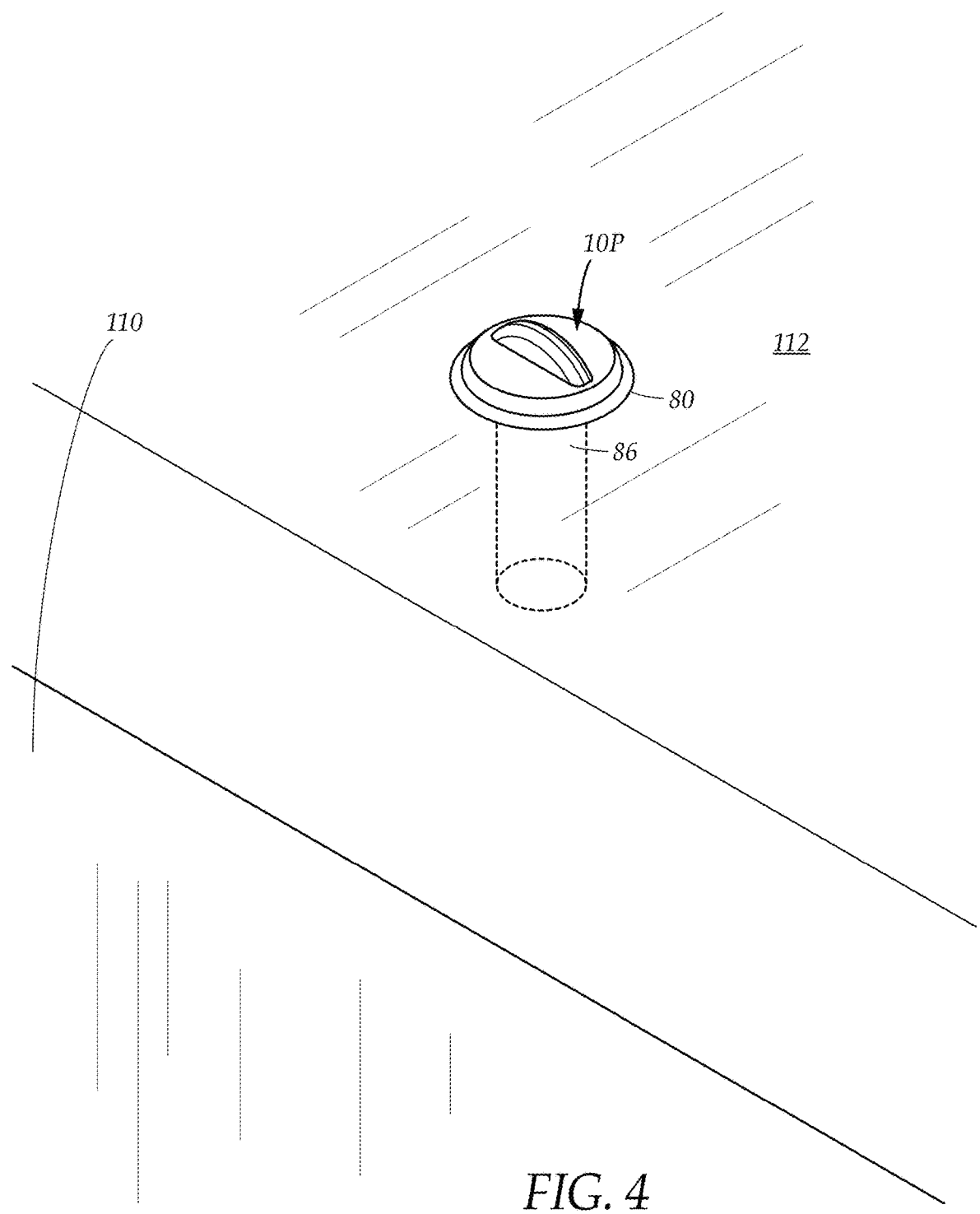
FIG. 4 is diagrammatical perspective view of the aerator valve embedded within the planar surface, further showing a prior art aerator cover installed, in accordance with an embodiment in the present disclosure.

FIG. 1 and FIG. 3 illustrate a protective sealing cover 10 for use with an aerator valve 80 of a swimming pool 110. The protective sealing cover 10 comprises a cap 12 and a plug 30 which projects therefrom. The protective sealing cover 10 is adapted to fully cover the aerator valve 80 to prevent the unwanted entry of water and debris.

Figure 5:
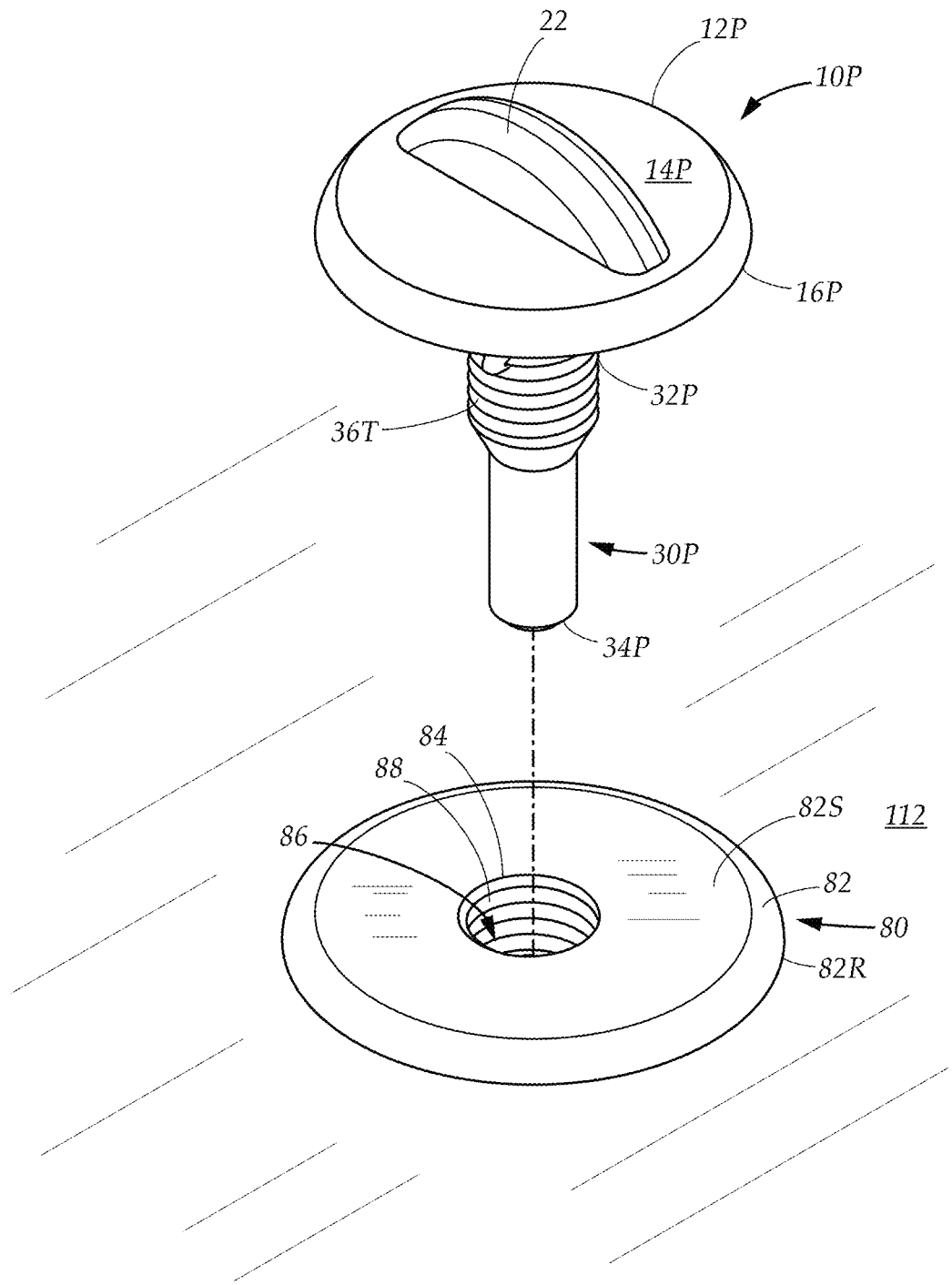
FIG. 5 is diagrammatical perspective view of the prior art aerator cover, showing a rigid cap with a cap grip projection, and a threaded plug which is inserted into the aerator valve, in accordance with an embodiment in the present disclosure.

Turning to FIG. 5 while also referring to FIG. 3, the aerator valve 80 is part of an aeration system which feeds water infused with air into the swimming pool 110. The swimming pool 110 has a plurality of planar surfaces 112, which can correspond to horizontal pool decking which surrounds the swimming pool 110 at ground level, as well as vertical walls of the swimming pool 110 itself. The aerator valve 80 is embedded within one of the planar surfaces 112, and comprises a hollow bore portion 86 which opens outwardly away from the planar surface 112 through an aperture 84. The aperture 84 is surrounded by a flange 82, which has a flange rim 82R and a flange outer surface 82S. Typically, the bore portion 86 is cylindrical in shape, while the aperture 84 and the flange rim 82R are circular in shape. The bore portion 86 further has a threaded inner surface 88. The flange 82 may project from the planar surface 112 such that the flange rim 82 extends outwardly away from the planar surface 112, with the flange outer surface 82S being level with the planar surface 112.

The aerator valve 80 functions by drawing in air through the bore portion 86 for use by the aeration system. When the swimming pool 110 is not in use, the aerator valve 80 is covered to prevent entry by moisture and debris into the bore portion 86. This can be performed as part of a winterization process.

FIG. 5 illustrates a prior art aerator cover 10P, comprising a rigid cap 12P with an upper surface 14P and a lower surface 16P, and a threaded plug 30P which projects from the lower surface 16P. The threaded plug 30P is covered by threads 36T which rotatably interlock with the threaded inner surface 88 of the aerator valve 80. The prior art aerator cover 10P is installed by inserting the threaded plug 30P through the aperture 84 and rotating the aerator cover 10P to interlock the threaded plug 30P within the bore portion 86 until the rigid cap 12P contacts the flange outer surface 82S.

The rigid cap 12P is typically formed from a hard plastic, ceramic, or other inelastic material, which does not allow the prior art aerator cover 10P to create a watertight seal. The prior art aerator cover 10P further has an elastic sealing ring positioned on the lower surface 16P of the rigid cap 12P around the threaded plug 30P which prevents water from seeping under the rigid cap 12P and penetrating into the bore portion 86, as the threaded plug 30P does not present a watertight barrier. To facilitate rotation of the prior art aerator cover 10P, the upper surface 14P of the rigid cap 12P has a cap grip projection 22 which projects upwardly, which allows a user to apply torque by hand to install or remove the prior art aerator cover 10P.

Figure 2:
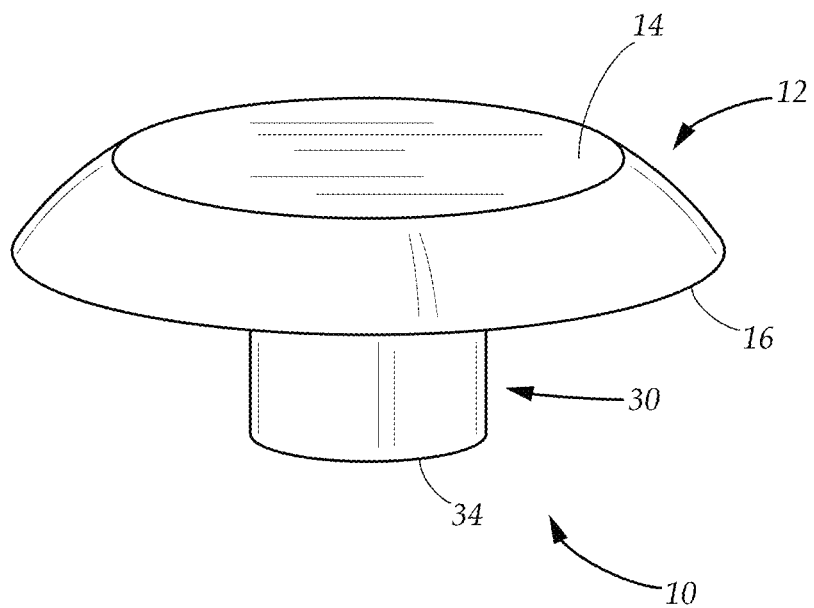
FIG. 2 is diagrammatical perspective view of the protective cover showing flat the outer surface of the cap, in accordance with an embodiment in the present disclosure.
Figure 6:
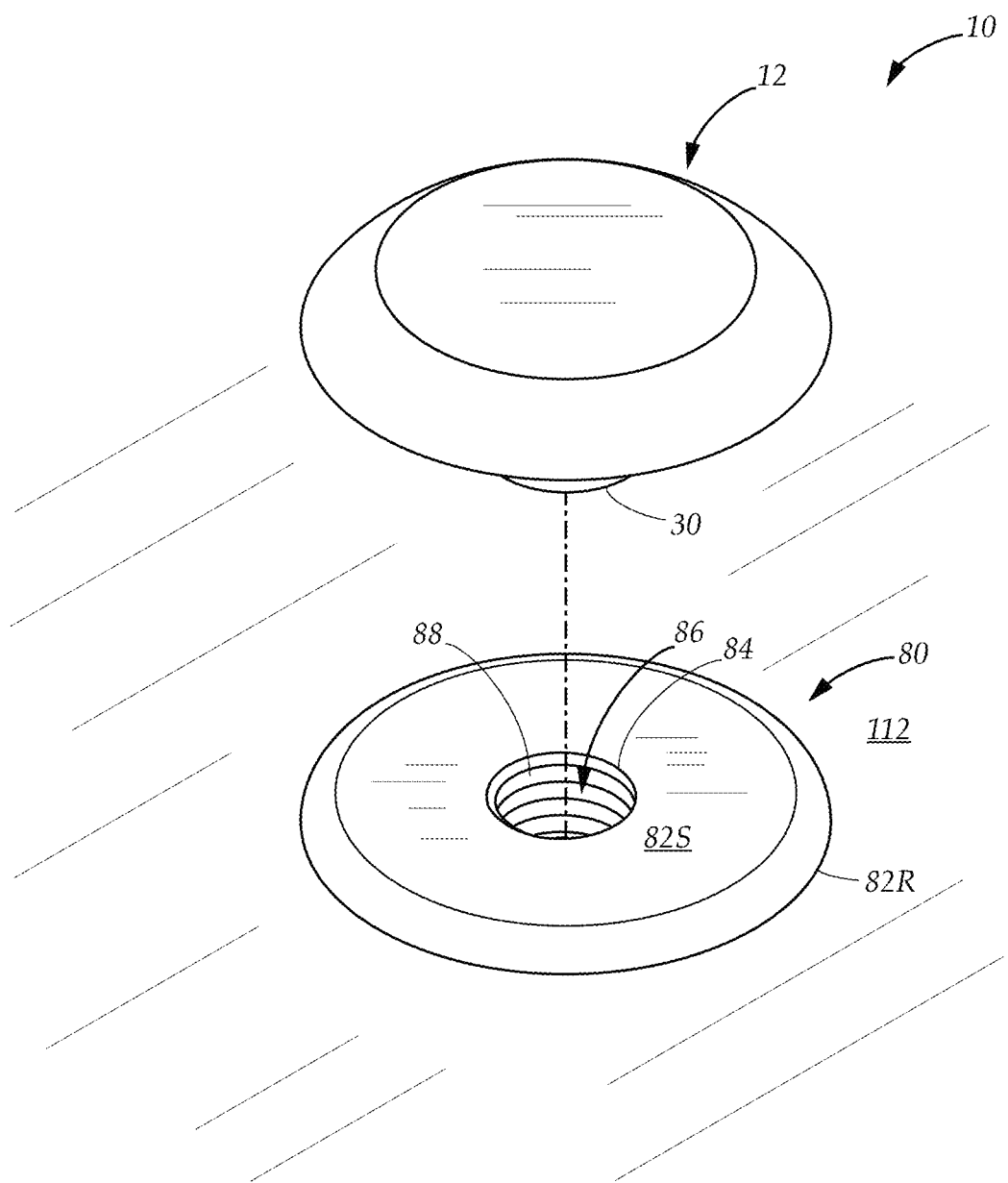
FIG. 6 is a diagrammatical perspective view of the protective sealing cap, with the plug of the protective sealing cap aligned for insertion into the aerator valve, in accordance with an embodiment in the present disclosure.
Figure 7:
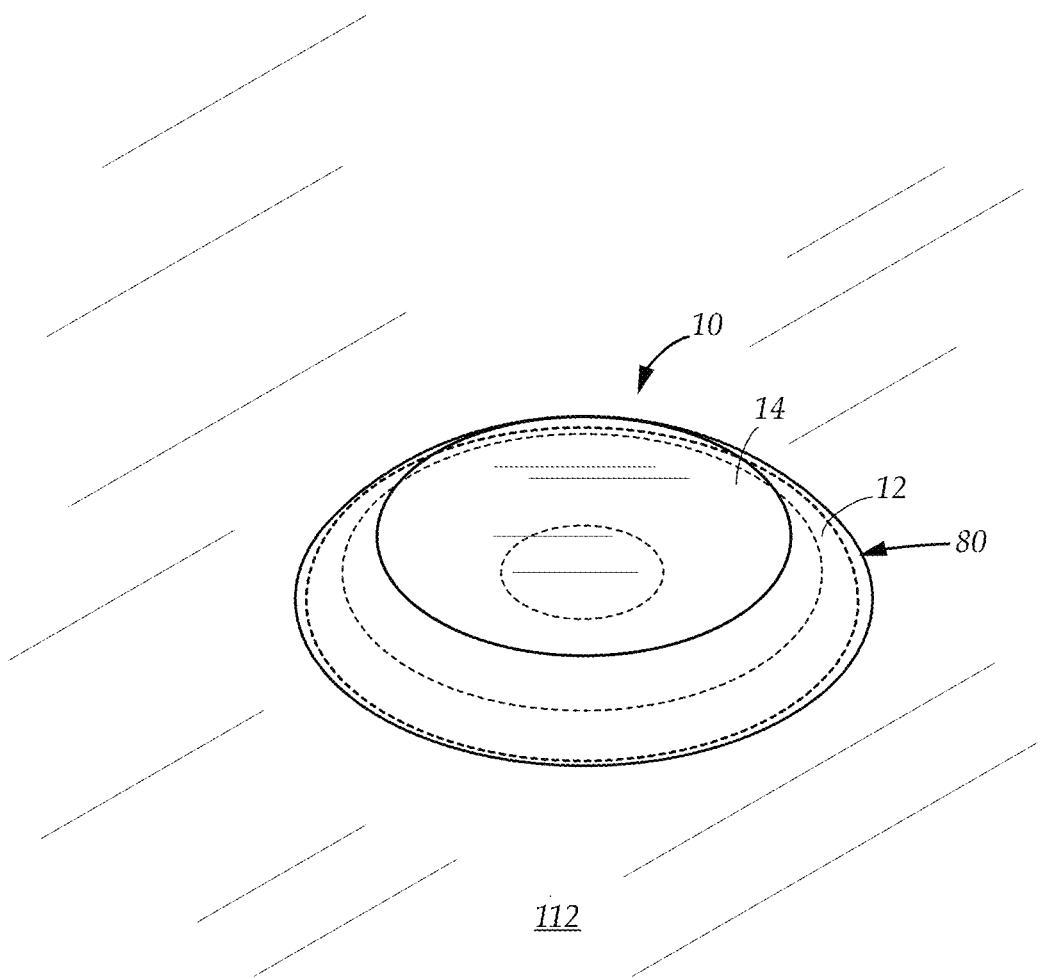
FIG. 7 is diagrammatical perspective view of the protective sealing cover installed over and fully enclosing the aerator valve, in accordance with an embodiment in the present disclosure.
Figure 8:
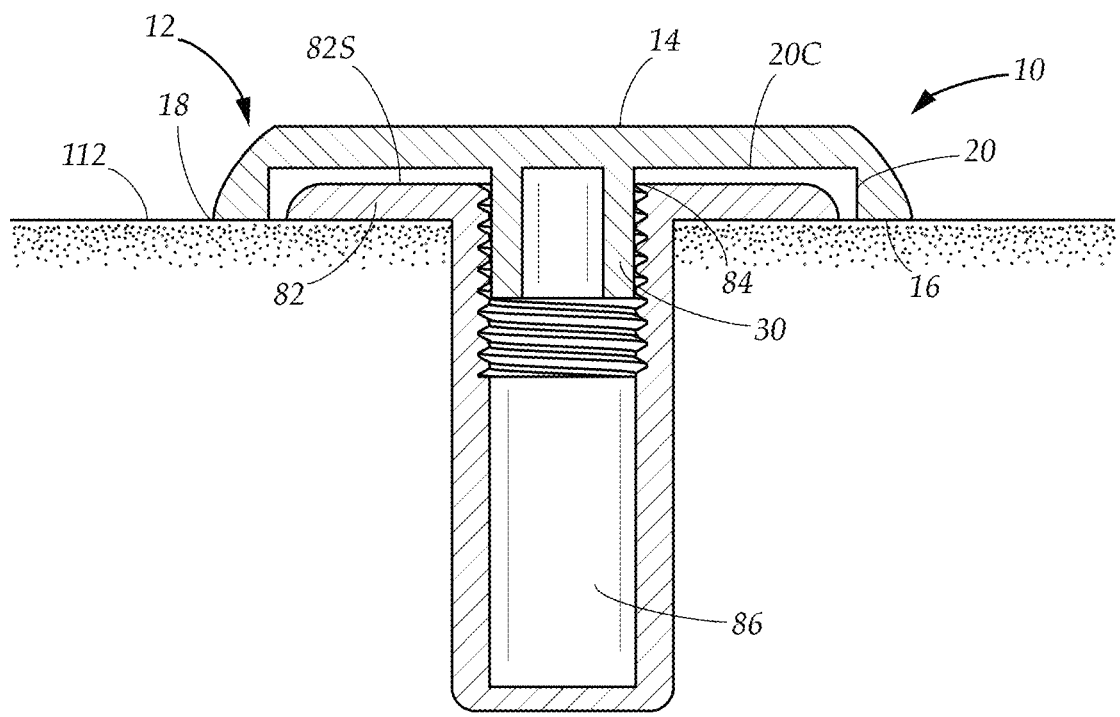
FIG. 8 is a cross sectional view showing the flange of the aerator valve extending upwardly into the cap recess of the protective sealing cover while the inner surface of the cap rests against the planar surface, in accordance with an embodiment in the present disclosure.

Turning to FIGS. 1-2 while also referring to FIG. 6, the cap 12 of the protective sealing cover 10 has an outer surface 14, inner surface 16 positioned opposite thereof, and a cap outer edge 18. The cap 12 also has a thickness as measured between the outer and the inner surfaces 14, 16. The plug 30 has a first end 32 which is attached to the inner surface 16 of the cap 12, a second end 34 which projects distally from the first end 32, and a plug surface 36 which extends between the first and second ends 32, 34. The plug 30 is cylindrical in shape, while the cap 12 is circular. In a preferred embodiment, both the cap 12 and the plug 30 are formed from a compressible, elastic material such as PVC, rubber, plastic, or other material with similar properties. In one embodiment, the cap 12 and the plug 30 are formed as a unitary component from a single continuous piece of material, while in alternative embodiments, the plug 30 and the cap 12 may be formed as separate components which are bonded together via adhesives or another suitable fastening means.

The plug 30 is adapted to be inserted through the aperture 84 of the aerator valve 80, to lodge within the bore portion 86. The plug 30 has a diameter which is substantially equal to the diameter of the aperture 84. Due to the compressibility of the plug 30, in certain embodiments, the diameter of the plug 30 may slightly exceed the diameter of the aperture 84. The plug 30 compresses inwardly, allowing the plug 30 to be pushed past the aperture 84 and the threaded inner surface 88 to form a watertight seal which prevents water and debris from entering the bore portion 86 through the aperture 84. Furthermore, the compressibility and elasticity of the plug 30 allows the plug surface 36 to conform to the threaded inner surface 88 of the bore portion, such as by expanding to return to the original diameter of the plug prior to compression. A lubricant such as grease may be applied to the plug 30 to reduce friction and facilitate installation and removal of the protective sealing cover 10.

In certain embodiments, the plug 30 is hollow and contains a hollow cavity 38 extending from the second end 34 towards the first end 32. The hollow cavity 38 increases the compressibility of the plug 30.

Referring to FIG. 1, FIGS. 6-7, and FIG. 8, the plug 30 is pushed through the bore portion 86 of the aerator valve 80 until the inner surface 16 of the cap 12 contacts the planar surface 112. In a preferred embodiment, the cap 12 has a diameter which is greater than the diameter of the flange 82 of the aerator valve 80. The cap 12 further has a cap recess 20 formed on the inner surface 16 which prevents the flange 82 from obstructing contact between the inner surface 16 and the planar surface 112, and allows the cap 12 to fully enclose the flange 82. The cap recess 20 is defined by a cap recess aperture 20B which opens away from the inner surface 16, and a cap recess surface 20C. The cap recess 20 has a depth which does not exceed the thickness of the cap 12, but which is at least equal to the flange height, as measured between the flange outer surface 82S and the planar surface 112. In a preferred embodiment, the cap recess 20 is substantially ring shaped. The cap recess 20 surrounds the plug first end 32, extends outwardly towards the cap outer edge 18, and has a diameter which is at equal to or greater than the diameter of the flange 82.

The protective sealing cover 10 may be removed from the aerator valve 80 by the user grasping the cap 12 and pulling away from the planar surface 112 to remove the plug from the bore portion 86 of the aerator valve 80. The elasticity of the cap 12 allows the user to lift the cap outer edge 18 away from the planar surface 112 without the need for grip-facilitating protrusions. In an embodiment where the protective sealing cover 10 is formed as a unitary component where the cap 12 and the plug 30 are formed from one continuous piece of material, the plug 30 is unlikely to tear or separate from the cap 12 when the plug 30 is extracted from the aerator valve 80.

Figure 9:
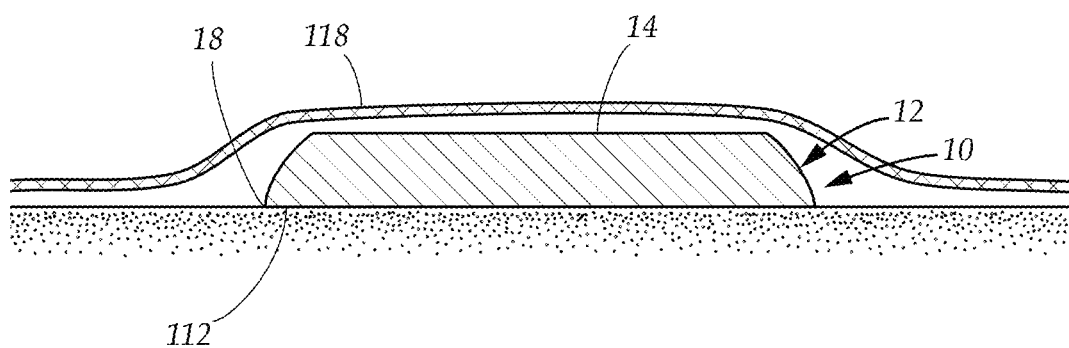
FIG. 9 is a cross sectional view showing a pool cover positioned over the protective sealing cap, in accordance with an embodiment in the present disclosure.

Referring to FIG. 9 while also referring to FIG. 3, in a preferred embodiment, the outer surface 14 of the cap 12 is substantially flat, and does not present any protrusions which may abrade or tear a pool covering sheet 118 which is placed over the swimming pool 110 in contact with the outer surface 14 of the protective sealing cover 10. In one embodiment, the cap outer edge 18 has a beveled, angled, or curved cross sectional shape. In one embodiment, the outer surface 14 has a diameter which is less than the diameter of the inner surface 16, and the cap outer edge 18 forms a curve, angle, or bevel which extends between the outer surface 14 and the inner surface 16. In other embodiments, the outer surface 14 may be convex in shape.

Referring to FIG. 1 and FIG. 3, the protective sealing cover 10 can be used to protect pool valves other than the aerator valve 80, as the plug 30 and cap 12 can be used with a variety of other valves, nozzles, or intakes which are positioned on the planar surfaces 112 of the swimming pool 110.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a protective sealing cover. The disclosure is illustrated by example in the drawing figures, and throughout the written description. It should be understood that numerous variations are possible, while adhering to the inventive concept. Such variations are contemplated as being a part of the present disclosure.

What is claimed is:

1. A protective sealing cover for use with an aerator valve of a swimming pool, the aerator valve is embedded upon a planar surface of the swimming pool, the aerator valve including a hollow bore portion extending inwardly away from the planar surface, an aperture which provides access to the hollow bore portion, and a flange which surrounds the aperture and projects outwardly away from the planar surface, the protective sealing cover comprising:

a cap including an outer surface, an inner surface disposed opposite the outer surface, and a cap outer edge surrounding the inner surface and the outer surface;

a cap recess disposed on the inner surface of the cap, the cap recess extending away from the inner surface of the cap toward the outer surface;

a plug positioned centrally within the cap recess, the plug including a first end and a distally oriented second end, the first end of the plug connected to the cap, and the second end projecting perpendicularly away therefrom, the plug adapted to be inserted into the hollow bore portion of the aerator valve via the aperture;

wherein the plug includes a compressible elastic material, allowing the plug to compress inwardly to pass through the aperture of the pool aerator valve and expand within the hollow bore portion to form a watertight seal which prevents entry of moisture into the hollow bore portion; and wherein the cap recess is adapted to receive the flange of the aerator valve, enclosing the flange and allowing the inner surface of the cap to rest against the planar surface.

2. The protective sealing cover as described in claim 1, wherein the cap recess is ring shaped and surrounds the first end of the plug.

3. The protective sealing cover as described in claim 2, wherein:

the plug has a hollow cavity which extends from the second end of the plug towards the first end, the hollow cavity facilitates inward compression of the plug.

4. The protective sealing cover as described in claim 2, wherein:

the outer surface of the cap has a diameter less than a diameter the inner surface of the cap, and the cap outer edge forms a curve, angle, or bevel which extends from the inner surface to the outer surface.

5. The protective sealing cover as described in claim 4 wherein:

the cap and the plug are configured as a unitary piece formed from the compressible elastic material.

6. A method for sealing a pool aerator valve of a swimming pool, the aerator valve embedded upon a planar surface of the swimming pool, the aerator valve including a hollow bore portion extending inwardly away from the planar surface, an aperture which provides access to the hollow bore portion, and a flange which surrounds the aperture and projects outwardly away from the planar surface, the method comprising the steps of:

providing a protective sealing cover, the protective sealing cover comprising a cap with an outer surface and an inner surface, a cap outer edge that surrounds the outer surface and the inner surface, a ring shaped cap recess positioned on the inner surface, and a plug extending away perpendicularly from the cap from a point surrounded by the cap recess, the plug including a compressible elastic material;

inserting the plug into the hollow bore portion of the pool aerator value through the aperture by compressing the plug inwardly to allow the plug to pass through the aperture into the hollow bore portion, thereby forming a watertight seal between the plug and the aperture which prevents entry of moisture into the hollow bore portion of the pool aerator valve; and covering the pool aerator valve by enclosing the flange within the cap recess, and resting the inner surface of the cap against the planar surface of the swimming pool.

7. The method as recited in claim 6, wherein:

the cap and the plug both include the compressible elastic material; and the step of covering the pool aerator valve is followed by the step of elastically bending the cap and lifting the cap outer edge away from the planar surface, and removing the plug from the pool aerator valve by grasping the cap and pulling away from the planar surface.

8. The method as recited in claim 6, wherein:

the cap outer edge incudes a curved shape;

the step of covering the pool aerator valve is followed by the step of covering the swimming pool and the protective sealing cover with a pool covering sheet, and the curved shape of the cap outer edge preventing the protective sealing cover from tearing the pool covering sheet.

\* \* \* \* \*